J. W. BUCKLAND.
UNIVERSAL POWER TRANSMISSION JOINT.
APPLICATION FILED JUNE 11, 1914.
1,127,352.  
Patented Feb. 2, 1915.
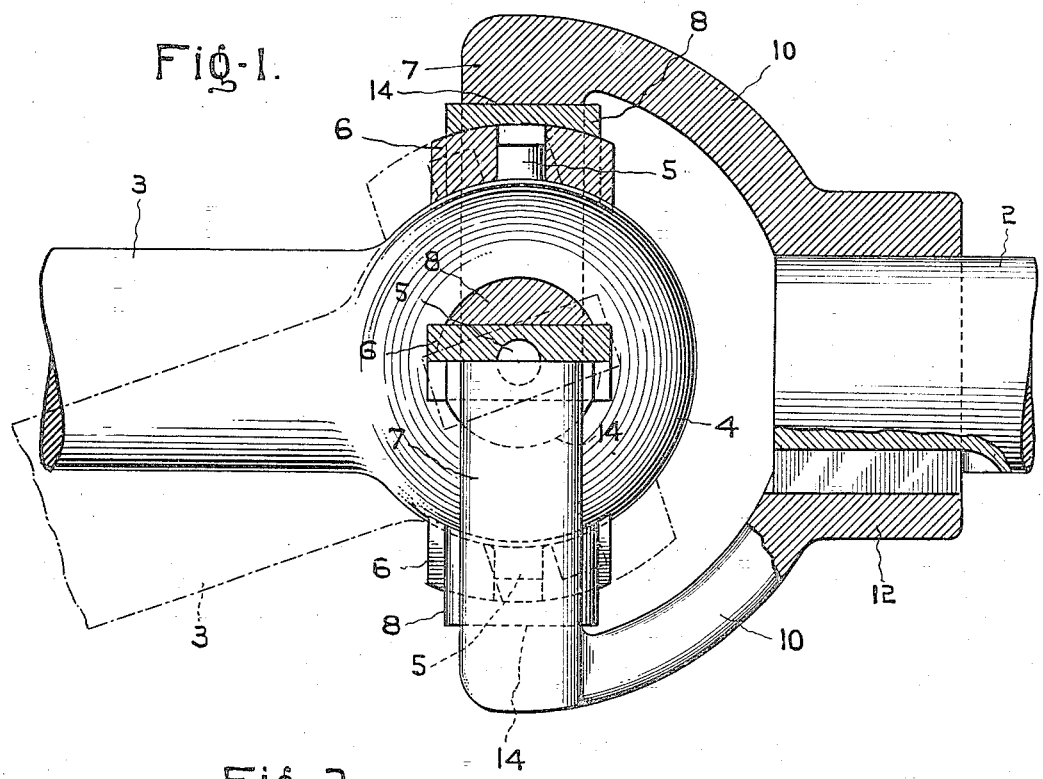
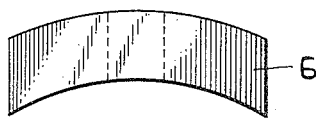
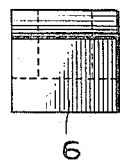
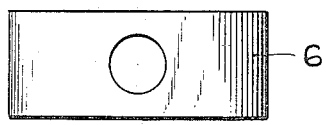
Witnesses  
Joseph W. Buckland,  
Inventor  
per Attorney.

UNITED STATES PATENT OFFICE.

JOSEPH W. BUCKLAND, OF MONTREAL, QUEBEC, CANADA.

UNIVERSAL POWER-TRANSMISSION JOINT.

1,127,352.  Specification of Letters Patent.  Patented Feb. 2, 1915.

Application filed June 11, 1914. Serial No. 844,520.

*To all whom it may concern:*

Be it known that I, JOSEPH WILLINGTON BUCKLAND, of the city of Montreal, in the Province of Quebec, Dominion of Canada, a subject of the King of Great Britain, have invented certain new and useful Improvements in Universal Power-Transmission Joints; and I do hereby declare that the following is a full, clear, and exact description of the same.

My invention has for its object to provide a joint capable of transmitting power with, practically, uniformity and to this end I provide a universal power-transmission joint comprising, in combination a pair of members for rotation in unison, a device, means effecting a rotatable connection between one of the members and the device, a second device rotatably mounted upon the other member and coinciding with the first mentioned device and means effecting sliding engagement between the said coinciding devices.

The invention also consists of the construction, combination and particular arrangement of parts herein described and illustrated in the accompanying drawings forming a part of this specification, and in which similar reference characters indicate the same parts.

Figure 1 is a side elevation partly in axial sectional view of a pair of shaft members united to rotate in unison by my improved joint; Fig. 2 is a detail perspective view of one of the devices forming the joint; and Figs. 3, 4, and 5 are, respectively, side elevation, end elevation and face view of another of the devices forming the joint.

Heretofore in joints of this type it was not possible to obtain practical uniformity in the transmission of power and the range of relative universal movement between the members joined has been of limited scope.

The particular object of my invention has been to overcome these defects and thereby provide a more uniform transmission of power with less loss from undue frictional resistance.

The members united by my improved joint are indicated at 2 and 3 and for purpose of illustration shaft ends are shown. The shaft end 3 is provided with a spherical end 4 and the shaft end 2 with a collar preferably comprising an annular part 7 supported from the shaft by arms 10. If desired, the connection between this annular part and the shaft may be effected by a hemispheroidal web. In either case the connection is made to the shaft by a collar 12 splined or otherwise rigidly fastened in place. This collar part 7 has a diameter sufficiently great to encircle the spherical end 4 with a space therebetween. This sphere 4 has a series (any desired number may be used) of trunnions 5 and the annulus has a corresponding number of circular recesses 14 the diameter of each of which is greater than the width of the annulus. In the space between the inner face of the annulus 7 and the surface of the sphere 4 is located a series of pairs of rotatable and relatively slidable plates, the rotatable relation being between these plates and the annulus and the sphere and the sliding connection being between the plates of each pair. One of the plates of each pair indicated at 8 is of circular form with its radial outer face flat and its inner face concaved and its concaved sides diametrically channeled to slidably engage the other plate indicated at 6, while this plate 6 is of oblong form concaved and convexed at its inner and outer sides respectively, the concaved surfaces of both of these plates being concentric with the sphere and the radially inner faces of these plates have sockets rotatably fitting upon the trunnions 5.

Operation: Assuming the member 2 to be the driving and the member 3 the driven part, the torque is transmitted through collar 12, connection 10, annulus 7, the walls of the recesses in the latter to the plates 8, the walls of the channels in the latter to the plates 6 then through trunnions 5 and sphere 4 to the member 3. During this operation the axes of the plates 6 and 8 are in radial alinement relatively to the sphere and no rotation of these plates takes place with relation to the sphere and annulus. Assuming now that the angular relation of the members 2 and 3 is changed and the axis of 3 is thrown to the position shown in dotted lines Fig. 1 then in order to transmit torque from member 2 to member 3 the plates 6 will travel with the sphere and follow a path in a plane at right angles to the member 3 and thereby pass from one side to the other of the plane of the annulus 7 both plates of each pair simultaneously rotating upon the trunnions 5 and within the recesses 14. The sliding of the plates 6 within the plates 8 is permitted by the channels 9 and the rotation of the plates with relation to the sphere and annulus by the trunnions 5 and recesses 14.

This novel joint is applicable to all connections requiring the transmission of rotation and more particularly to shafts the ends of which require or are liable to vibrate or be swung to different relative positions, and shafts in which it is required to transmit power in a direction at right angles.

What I claim is as follows:—

1. A universal power-transmission joint comprising in combination with a pair of members for rotation in unison, one of such members being a shaft and having a spheroidal end, an annular carrier encircling the spheroidal end and having a series of spaced circular recesses in its inner perimeter, a series of pairs of plates for flexible rotative connection between the spheroidal end and annular carrier, one plate of each pair being rotatably seated in one of the recesses in the annulus, means effecting rotatable connection between the other plate of each pair and the spheroidal end, means effecting sliding engagement between the plates of each pair and means whereby a rotative connection is effected between the annular carrier and the other member.

2. A universal power-transmission joint comprising in combination with a pair of members for rotation in unison, one of such members being a shaft and having a spheroidal end, an annular carrier encircling the spheroidal end and having a series of spaced circular recesses in its inner perimeter, a series of pairs of circular plates for flexible rotative connection between the spheroidal end and annular carrier, one plate of each pair being rotatably seated in one of the recesses in the annulus and being of circular form with a diametrical channel in its inner side slidably containing the other plate and the other plate being of oblong form with one side concaved concentrically to the sphere and resting rotatably thereon, means effecting rotatable connection between the last mentioned plate of each pair and the spheroidal end and means whereby a rotative connection is effected between the annular carrier and the other member.

3. A universal power-transmission joint comprising in combination with a pair of members for rotation in unison, one of such members being a shaft and having a spheroidal end, an annular carrier encircling the spheroidal end and having a series of spaced circular recesses in its inner perimeter, a series of pairs of plates for flexible rotative connection between the spheroidal end and annular carrier, one plate of each pair being rotatably seated in one of the recesses in the annulus, means effecting rotatable connection between the other plate of each pair and the spheroidal end consisting of a series of trunnions carried rigidly by the sphere and engaging sockets in the last mentioned plates, means effecting sliding engagement between the plates of each pair and rigid means whereby a rotative connection is effected between the annular carrier and the other member.

4. A universal power-transmission joint comprising in combination with a pair of members for rotation in unison, one of such members being a shaft and having a spheroidal end, an annular carrier encircling the spheroidal end and having a series of spaced circular recesses in its inner perimeter, a series of pairs of circular plates for flexible rotative connection between the spheroidal end and annular carrier, one plate of each pair being rotatably seated in one of the recesses in the annulus and being of circular form with a diametrical channel in its inner side slidably containing the other plate and the other plate being of oblong form with one side concaved concentrically to the sphere and resting rotatably thereon and having sockets in its concaved side, means effecting rotatable connection between the last mentioned plate of each pair and the spheroidal end consisting of a series of trunnions carried rigidly by the sphere and engaging sockets in the last mentioned plates and rigid means whereby a rotative connection is effected between the annular carrier and the other member.

5. A universal power-transmission joint comprising in combination with a pair of members for rotation in unison, one of such members being a shaft and having a spheroidal portion, an annular carrier encircling the spheroidal portion and having a series of spaced circular recesses in its inner perimeter, a series of pairs of plates for flexible rotative connection between the spheroidal end and annular carrier, one plate of each pair being rotatably seated in one of the recesses in the annulus, means effecting rotatable connection between the other plate of each pair and the spheroidal end, means effecting sliding engagement between the plates of each pair and means whereby a rotative connection is effected between the annular carrier and the other member.

In testimony whereof I have signed my name to this specification in the presence of two witnesses.

JOSEPH W. BUCKLAND.

Witnesses:
E. R. PITTS,
WILLIAM J. C. HEWETSON.